J. WATERLOO.
APPARATUS FOR CUTTING GLASS.
APPLICATION FILED SEPT. 20, 1918.
1,324,219.
Patented Dec. 9, 1919.
4 SHEETS—SHEET 2.
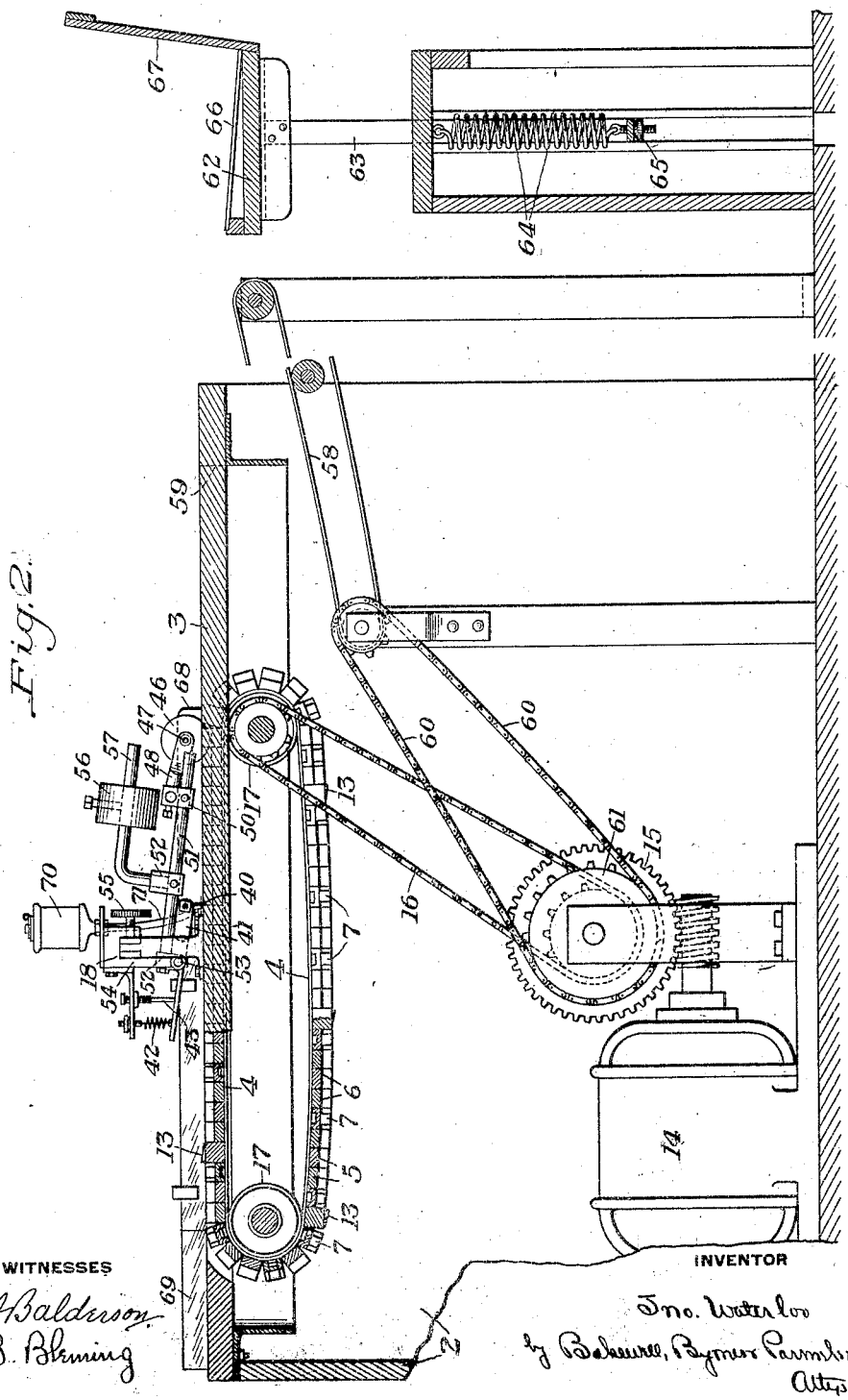

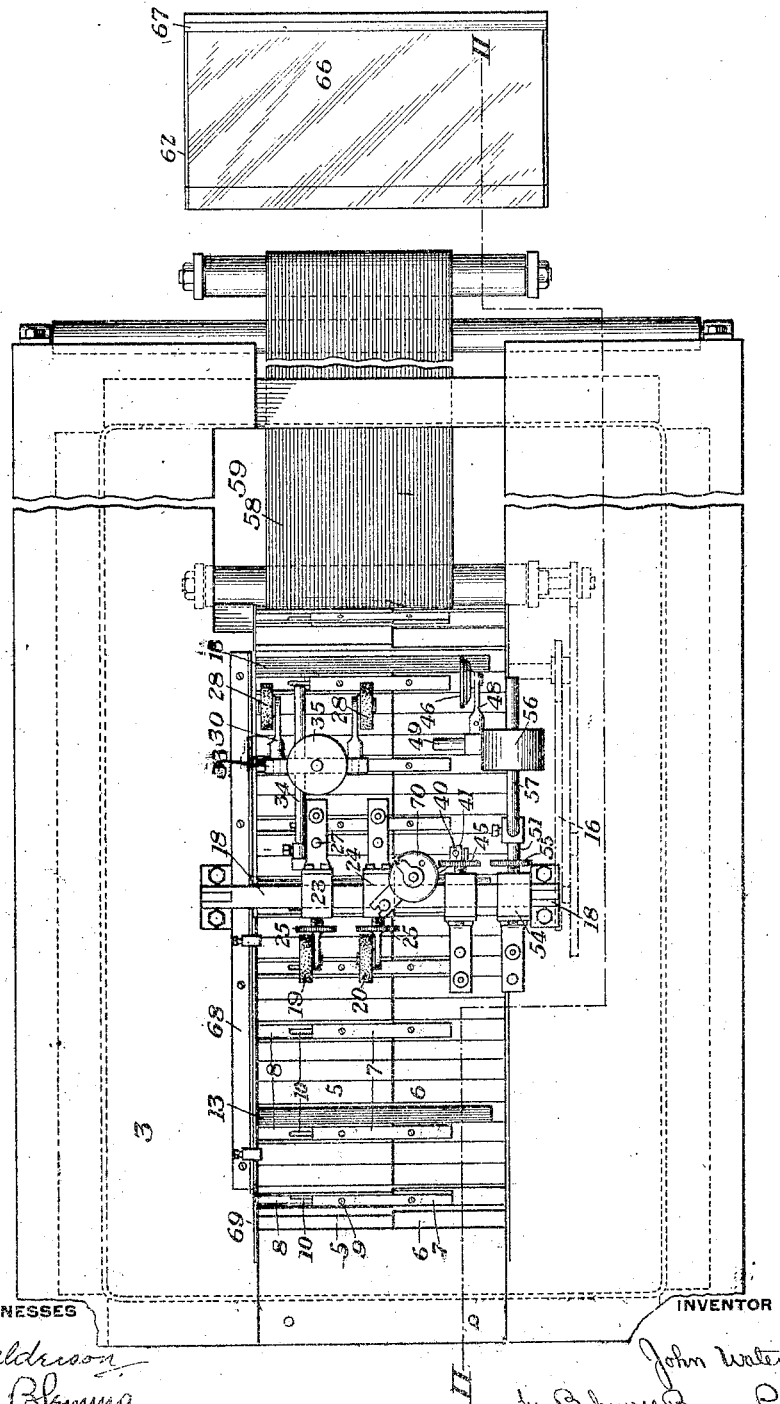

J. WATERLOO.
APPARATUS FOR CUTTING GLASS.
APPLICATION FILED SEPT. 20, 1918.
1,324,219.
Patented Dec. 9, 1919.
4 SHEETS—SHEET 3.
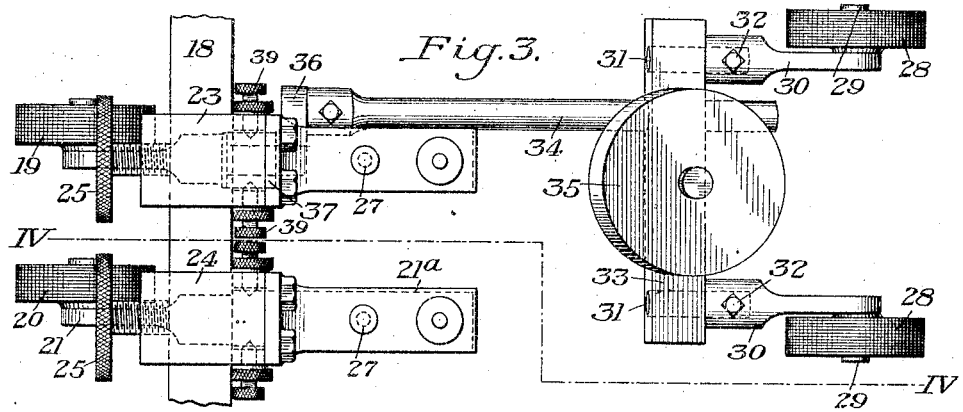
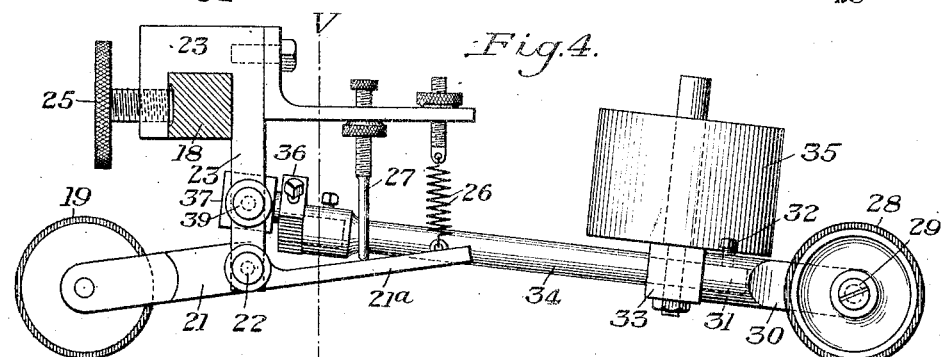
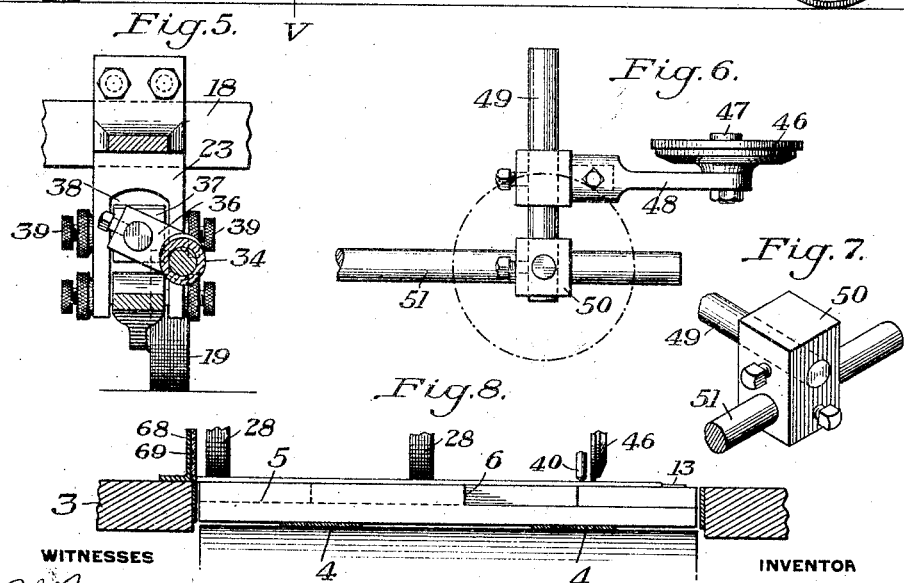
WITNESSES
INVENTOR J. WATERLOO.
APPARATUS FOR CUTTING GLASS.
APPLICATION FILED SEPT. 20, 1918.
1,324,219.
Patented Dec. 9, 1919.
4 SHEETS—SHEET 4.
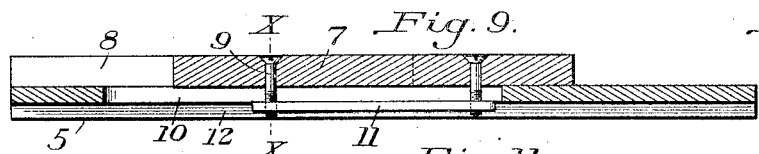
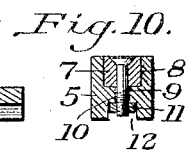
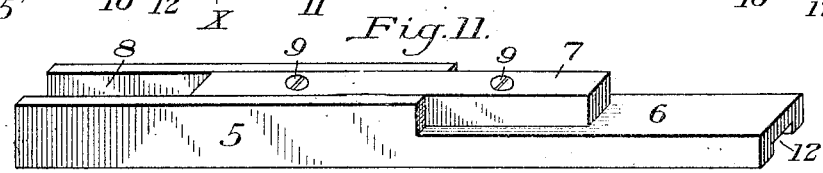
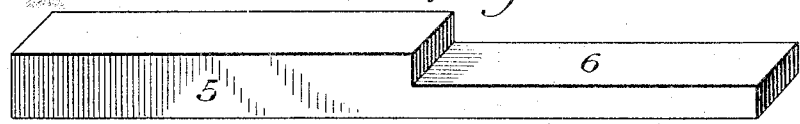
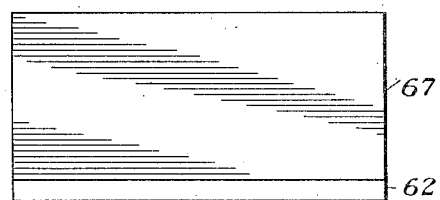
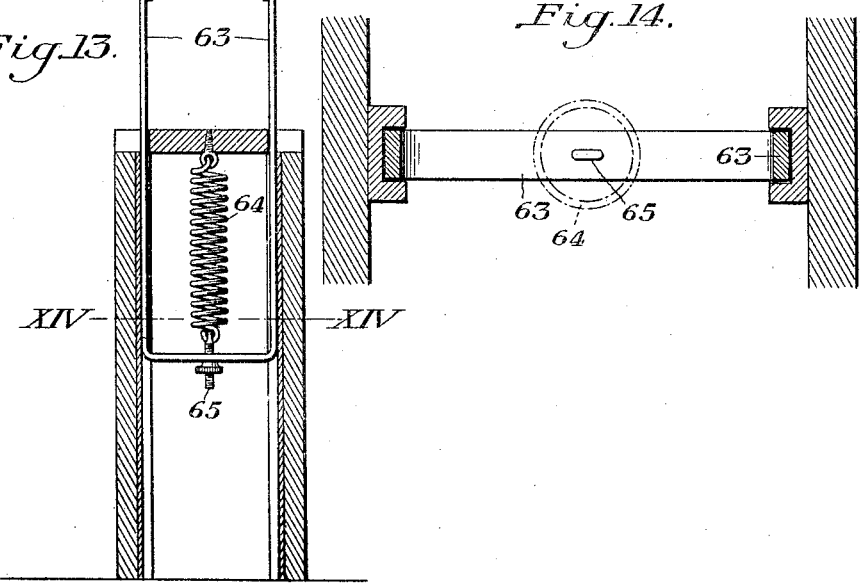
WITNESSES
INVENTOR

UNITED STATES PATENT OFFICE.

JOHN WATERLOO, OF NEW EAGLE, PENNSYLVANIA, ASSIGNOR TO WINDOW GLASS MACHINE COMPANY, OF PITTSBURGH, PENNSYLVANIA, A CORPORATION OF NEW JERSEY.

APPARATUS FOR CUTTING GLASS.

1,324,219.   Specification of Letters Patent.   Patented Dec. 9, 1919.

Application filed September 20, 1918. Serial No. 254,963.

*To all whom it may concern:*

Be it known that I, JOHN WATERLOO, a resident of New Eagle, in the county of Washington and State of Pennsylvania, have invented a new and useful Improvement in Apparatus for Cutting Glass, of which the following is a full, clear, and exact description, reference being had to the accompanying drawings, forming part of this specification, in which—

Figure 1 is a plan view partly broken away of apparatus embodying my invention;

Fig. 2 is a section on the irregular line II—II of Fig. 1;

Fig. 3 is a plan view of a portion of the apparatus on a larger scale;

Fig. 4 is a section on the irregular line IV—IV of Fig. 3;

Fig. 5 is a section on the line V—V of Fig. 4;

Fig. 6 is a plan view of the breaker device;

Fig. 7 is a perspective view of one of the parts of the breaker device;

Fig. 8 is a transverse section through the upper portion of the cutting table and illustrating the action of the cutting and breaker devices;

Fig. 9 is a detail sectional view of one of the adjustable pallets;

Fig. 10 is a section on the line X—X of Fig. 9;

Fig. 11 is perspective view of one of the adjustable pallets;

Fig. 12 is a perspective view of one of the cutting table strips;

Fig. 13 is a sectional view of the stacking chair; and

Fig. 14 is a section on the line XIV—XIV of Fig. 13.

My invention has relation to glass-cutting apparatus, and more particularly to a machine or apparatus for cutting or trimming the edges of glass sheets to a predetermined size. One object of my invention is to provide an apparatus or machine of this character which will reduce the manual labor required and will enable the operations to be carried on much more rapidly and efficiently. A further object of my invention is to provide a machine or apparatus of this character, in which mechanical means of simple and effective character are provided for accurately and uniformly breaking off the trim or cull portions of the sheets after they have been scored by the cutting tool.

Other objects of my invention have relation to the construction and arrangement of parts whereby adjustment of the machine to sheets of different widths may be readily effected and for facilitating the general operation of the machine.

My invention will be best understood by reference to the accompanying drawings, in which I have shown a preferred embodiment thereof and which will now be described, it being premised, however, that various changes may be made in the details of construction, arrangement and combination of parts, without departing from the spirit and scope of my invention as defined in the appended claims.

In these drawings, the numeral 2 designates the frame of the machine which supports the main table 3. The latter is cut away longitudinally to receive therein the cutting table, which consists of an endless moving conveyer. This may be conveniently formed by the two endless belts 4 (Fig. 8) to which are secured a plurality of transverse strips or cleats 5, the latter being arranged to lie closely side by side at the upper working portion of the table to form a supporting surface for the glass sheets to be cut or trimmed. For reasons which will hereinafter appear, the working surface of the table should have portions at different levels. For this purpose, one end portion of the strips 5, is reduced in thickness at its upper side, as indicated at 6. This is best shown in detail in Fig. 12, although indicated in other views.

Certain of the strips or cleats 5 are provided with the transversely adjustable pallets 7, which are seated in transverse grooves or guides 8, of such cleats, and can be slid transversely therein so as to extend a greater or less portion of their length on to the reduced portion of the cleats. These pallets are secured in desired adjustment by any suitable means, such as the screws 9, which pass through a slot 10 and engage a bar 11, which acts as a nut for the screws, and which is arranged to slide in the bottom groove 12.

The table is also provided at intervals with transversely extending raised cleats 13, having beveled upper surfaces. The sheets to be cut or trimmed are placed upon the table between these cleats 13. The cutting table may be driven in any suitable manner. In the machine shown in the drawings, there is provided an electric motor 14, driving a gear wheel 15, connected by a belt 16 with one of the rolls 17 upon which the table is carried.

18 designates a supporting bar which extends transversely across the cutting table and which forms a carrier for a number of parts now to be described. 19 and 20 designate two holding-down wheels, which are journaled on levers 21, which are pivoted at 22 to the respective brackets 23 and 24. These brackets are provided with hook-shaped upper portions which engage the transverse support 18 in the manner best shown in Fig. 4, and are adjustably secured on said support by means of the set screws 25. The pivots for the levers 21 are shown as formed by trunnion screws, as best shown in Figs. 3 and 5. Each of the levers 21 has a tail extension 21ª, to which is attached a tension spring 26, whereby the desired amount of pressure may be exerted by said wheels. An adjustable stop 27 is also provided for controlling and limiting such pressure.

28 designates two other presser wheels, each of which is shown as journaled on a stud 29, carried by an arm 30, having a socket at its inner end which fits over a stud 31, and is secured thereto by a set screw 32. The two studs 31 are carried by the cross bar 33, which is adjustably mounted on a rod 34, and carries a weight 35. The rod 34 is provided with an offset or crank end portion 36, which is journaled in a block 37, pivoted in the slot 38 of the bracket 23. The pivots for the block 37 preferably consist of trunnion screws 39.

The cross member 33 can be adjusted to any desired position on the rod 34, and the transverse distance between the two wheels 28 may be varied by loosening the set screws 32 and rotating the arms 30 on the stud 31, through an angle of 180°, thereby bringing the two wheels closer together. The relation of the wheels 28 to the wheels 19 and 20 is such that the glass sheet being cut will be engaged by the wheels 28 before it leaves the wheels 19 and 20.

The numeral 40 designates a cutting tool or point, such as a diamond, which is adjustably carried in a pivoted lever member 41, (see Fig. 2) provided with a tensioning spring 42, and adjustable stop 43. The pivoted lever 41 is journaled to a depending arm of a bracket 44, which is adjustably secured on the support 18, by means of a set screw 45. In use, the position of the cutter is adjusted so that it will be adjacent to the ends of the adjustable pallets 7, substantially as shown in Fig. 8.

The numeral 46 designates a breaker wheel, preferably of wood fiber or some non-metallic material, and which is journaled to a stud 47, secured to an arm 48, which is transversely adjustable on the pin or stud 49, as best shown in Fig. 6. The pin or stud 49 is carried by a block 50, which is adjustable longitudinally on the rod 51. The rod 51 is secured at its end portion in a block 52, which is trunnioned at 53 in a bracket 54, adjustably secured to the support 18 by means of the set screw 55 (see Fig. 2). 56 is a weight which is adjustably mounted on the arm 57, which is, in turn, adjustably mounted on the rod 51, (see Fig. 2) and by means of which the necessary pressure is applied to the wheel 46.

58 designates a conveyer, on to which the cut and trimmed sheets are delivered from the end of the cutting table, the sheets falling onto this conveyer 58, through the opening 59 in the table 3. This conveyer 58 may be driven in any suitable manner, as by a belt 60 from a belt wheel 61, driven by the motor 14. Separate driving means may, however, be employed for this conveyer, which should be driven at a higher rate of speed than that of the cutting table. This conveyer is preferably inclined upwardly from its receiving to its discharge end, as shown in Fig. 2, and is arranged to deliver the cut and trimmed sheets on to a stacking chair. The latter consists of a base member 62, which is carried on a yoke 63 (see Figs. 2, 13 and 14) provided with a calibrated supporting spring 64, one end of which is provided with an adjusting device 65, whereby the tension of the spring may be varied according to the weight to be carried. This weight will necessarily depend upon the thickness and size of the cut and trimmed sheets, which are delivered to the chair. The chair is provided above the base portion with a rearwardly and downwardly inclined plate 66, which may consist of a glass sheet. The chair also has an upwardly and rearwardly inclined back portion 67. The upward inclination of the conveyer 58 acts to deliver the glass sheets on to the supporting plates 66, upon which they are stacked in succession, the base 62 lowering as the weight on the spring 64 increases. In this manner, the cut and trimmed sheets are successively stacked or piled on the chair, each sheet being received thereon at substantially the same level.

The cutting table is provided at one side with an edge guide, which is shown as consisting of an angle 68, having a facing 69, which may consist of a glass strip. The purpose of this facing is to provide a smooth polished surface for the edges of the glass sheets and to prevent wear upon the angle.

The numeral 70 designates a lubricant reservoir which supplies the usual wiper 71, which acts upon the surface of the sheet just in advance of the cutting tool.

The operation is as follows: The sheets to be cut or trimmed are placed upon the receiving end portion of the table 3 and are fed in succession by an operator to the moving cutting table, each sheet being placed between two of the cleats 13. The pallets 1 are adjusted transversely according to the width of the sheets desired, leaving that portion of the edge of each sheet which is to be trimmed off in an overhanging position beyond the end of the pallets, as indicated in Fig. 8. The breaker wheel 46 is adjusted so that, as also shown in said figure, it will be directly over this over-hanging portion of the sheets and just outside of the line of action of the cutting tool.

The sheets are successively moved under the presser wheels 19 and 20 to the action of the cutting tool, and thence to the action of the breaker wheel. When the latter is engaged by the inclined upper face of a cleat 13, it is raised as the cleat passes thereunder, and then drops down on to the overhanging portion of the glass sheet, striking the latter with sufficient force to break off the trim or cull outside of the score line made by the cutting tool.

Heretofore, in so far as I am aware, this work of breaking off the trim or cull has been done by an operator using the fingers to exert a breaking leverage thereon. In this manual operation, the breaking, even when done with extreme care, will not be uniform, since the angle of breakage may vary considerably, according to the nature of the leverage exerted. The fracture, therefore, instead of being in a vertical plane, may occur on an oblique plane through the thickness of the sheet, the obliquity either under-running the upper edge of the fracture or reversely. This gives a slight variation in the dimensions of the sheet between the two sides thereof, which is extremely objectionable, where a perfectly true edge and accurate size is required, as for instance, in photographic dry plate work. By the provision of the breaker device hereinbefore described this breaking off of the trim or cull is done mechanically and in a substantially uniform manner, the plane of fracture of successive sheets being substantially the same. Further, in the hand operation, fins or projections may be left, whereas with this breaker device, these are prevented and a true break is made throughout the length of the sheet.

The cut and trimmed sheets are successively delivered through the opening 59 on to the plate 58 and are stacked on the stacking chair. When a predetermined number of sheets has been delivered in the stack, the stacks can be removed either for packing, if the trimming is the last operation, or for further inspection or other operations. As they are removed from the chair, their edges can be readily inspected and if there are any sheets with ragged or defective edges, they can be readily detected and removed from the stack.

My invention entirely obviates the use of an operator, who has heretofore been required to remove the scored sheets from the cutting table and break off the trim or cull and stack the sheets. The operations can be carried out rapidly and accurately, and the entire machine is simple in its construction and mode of action.

I claim:

1. Glass-cutting apparatus, comprising a moving cutting table having its surface at two different levels transversely thereof and provided with transversely adjustable glass-supporting members, substantially as described.

2. Glass-cutting apparatus, comprising a movable cutting table having its working surface at a lower level at one side of the table than at the other, adjustable pallets extending on to the portion of lower level, and a transversely adjustable cutting tool mounted over the table and adapted to act upon a glass sheet at a point adjacent to the ends of the pallets, substantially as described.

3. Glass-cutting apparatus, comprising a cutting table in the form of an endless conveyer and having its working surface composed of a plurality of transverse strips or cleats arranged side by side, said strips or cleats having one end portion of reduced thickness, and transversely adjustable pallets mounted on some of said strips or cleats, substantially as described.

4. Glass-cutting apparatus, comprising an endless cutting table, means for moving the same, a cutting tool mounted above the table, and a mechanical breaker device also mounted above the table for breaking off the trim or cull from the sheets, said device being normally out of contact with the glass being cut, and means for periodically actuating the said device to contact it with the glass substantially as described.

5. In glass-cutting apparatus, the combination with a cutting table and a cutting tool coöperating with the table, of a mechanical breaker device for breaking off the trim or cull from the sheets, together with means for imparting successive vertical breaking movements to said device, substantially as described.

6. In glass-cutting apparatus, the combination with a cutting table and a cutting tool coöperating with the table, of a mechanical breaker device for breaking off the trim or cull from the sheets, together with means for actuating said breaker device at intervals, substantially as described.

7. In glass-cutting apparatus, the combination with a cutting table and a cutting tool coöperating with the table, of a mechanical breaker device for breaking off the trim or cull from the sheets, the table having means for actuating the breaker device at intervals, substantially as described.

8. In glass-cutting apparatus, the combination with an endless moving cutting table having transversely extending members between which the sheets to be cut are placed, of a mechanical breaker device, and means on said members for actuating said device, substantially as described.

9. Glass-cutting apparatus comprising an endless cutting table having transversely adjustable supports for one edge portion of the sheets to be cut, a cutting tool mounted above the table, and a mechanical breaker device arranged to act upon the edge portions of the sheet outside of the adjustable supports, substantially as described.

10. Glass-cutting apparatus, comprising an endless cutting table, a cutting tool supported above the table, and presser devices arranged at opposite sides of the tool for holding the glass sheets to the table, substantially as described.

11. Glass-cutting apparatus, comprising an endless cutting table, a cutting tool supported above the table, and presser devices arranged at opposite sides of the tool for holding the glass sheets to the table, said presser devices having means for adjusting their pressure, substantially as described.

12. Glass-cutting apparatus comprising an endless movable table having transversely adjustable supports for one edge portion of the sheet to be cut, a cutting tool arranged to act upon the sheets on a line adjacent to the ends of said supports, and a mechanical breaker device arranged to act upon the sheet at a point beyond the ends of said supports, and means for effecting transverse adjustment of said supports, of the cutting tool and of said breaker device, substantially as described.

13. In glass-cutting apparatus, the combination with an endless moving table and a cutter coöperating therewith, of a presser device comprising a pivoted arm or rod, a weighted transverse member adjustably mounted thereon, and a pair of presser wheels carried by said transverse member, substantially as described.

14. In glass-cutting apparatus, the combination with an endless moving table and a cutter coöperating therewith, of a presser device comprising a pivoted arm or rod, a weighted transverse member adjustably mounted thereon, and a pair of presser wheels carried by said transverse member, together with means for varying the transverse distance between said wheels, substantially as described.

15. In glass-cutting apparatus, the combination with a cutting table and a cutter coöperating therewith, of a presser device comprising a pivoted arm, a transverse member carried thereby, a pair of presser wheels carried by said transverse member, and means for varying the transverse distance between said wheels, substantially as described.

16. In glass-cutting apparatus, the combination with a cutting table and a cutter coöperating therewith, of a presser device comprising a pivoted carrier, a transverse member on said carrier, a pair of arms rotatably secured to said transverse member, and a presser wheel mounted on each of said arms, substantially as described.

17. In glass-cutting apparatus, the combination with a cutting table and a cutter coöperating therewith, of a breaker device comprising a weighted arm, and a breaker wheel carried by said arm, together with means for actuating said arm, substantially as described.

18. In glass-cutting apparatus, the combination with a cutting table and a cutting tool, of a breaker device comprising a pivoted weighted carrier, a breaking member adjustably mounted on said carrier, and means for operating said carrier, substantially as described.

19. In glass-cutting apparatus, the combination with a cutting table having supports for one edge portion of the glass, and arranged to permit a part of such portion to overhang the supports, of a breaker device arranged to act upon such overhanging portion, substantially as described.

20. Glass-cutting apparatus comprising an endless movable cutting table, a conveyer belt arranged to receive the sheets from said table, and a vertically movable spring-supported stacking chair arranged to receive the sheets from said conveyer, substantially as described.

21. In glass-cutting apparatus, the combination of an endless cutting table, an endless conveyer arranged to receive the cut sheets from said table, a stacking chair arranged to receive the sheets from the conveyer, and an adjustable spring seat for the stacking chair, substantially as described.

22. In glass-cutting apparatus, the combination of an endless cutting table, an endless conveyer arranged to receive the cut sheets from said table, a stacking chair arranged to receive the sheets from the conveyer, and an adjustable spring seat for the stacking chair, said conveyer being inclined upwardly from its receiving toward its discharge end, substantially as described.

23. In glass-cutting apparatus, the combination of an endless cutting table, an endless conveyer arranged to receive the cut sheets from said table, a stacking chair arranged to receive the sheets from the conveyer, and an adjustable spring seat for the stacking chair, said conveyer being inclined upwardly from its receiving toward its discharge end, and said stacking chair having a downwardly and rearwardly inclined support for the sheets, substantially as described.

In testimony whereof, I have hereunto set my hand.

JOHN WATERLOO.